Patented June 22, 1954

2,681,879

UNITED STATES PATENT OFFICE 2,681,879

CARBAMIC ACID ESTERS AS WELL AS PEST COMBATTING AGENTS AND A METHOD OF MAKING THE SAME

Hans Gysin, Alfred Margot, and Charles Simon, Basel, Switzerland, assignors to J. R. Geigy A. G., Basel, Switzerland, a Swiss firm No Drawing. Application August 11, 1950, Serial No. 178,986

Claims priority, application Switzerland August 22, 1949

2 Claims. (Cl. 167—33)

According to this invention, 2,6-dimethyl-pyridyl-(4)-dimethyl carbamate is excellently suited for combatting pests such as insects and other arthropods and also their stages of development.

The new compound can be produced by the reaction of dimethyl carbamic acid chloride with lutidone (2,6-dimethyl-4-hydroxypyridine or 2,6-dimethyl-$\gamma$-pyridone). The reaction may be performed in the presence of acid binding agents or with salts of the above named enols.

The reaction may take place in the presence or absence of solvents such as benzene, acetone, dioxane, acetic acid ethyl ester. Acid binding agents which come into consideration are, e. g. potassium carbonate, sodium carbonate, sodium bicarbonate, sodium ethylate, or tertiary organic bases such as triethylamine. In particular, the alkali salts and also e. g. the salts of monovalent heavy metals are suitable as enol salts.

The following examples illustrate the production of the new compounds. Parts are always given as parts by weight, the temperatures are given in degrees centigrade.

Example 1

12.3 parts of lutidone are converted into the potassium salt by subjecting the benzene suspension with the addition of 14 parts of potash to azeotropic distillation by means of a separator for some hours, so that the benzene returns to the reaction mixture whilst the water is separated off. After the addition of 11 parts of dimethyl carbamic acid chloride, the reaction mixture is heated for about 12 hours under reflux after which the inorganic salt is filtered off under suction. The benzene is distilled off and the residue is fractionated in the vacuum. 2.6-dimethyl-pyridyl-(4)-dimethyl carbamate passes over at 150–153° at 11 mm. pressure as a colourless oil which congeals on cooling and melts at 73–74° when recrystallised from cyclohexane.

The biological properties of the new compound are useful in various fields of pest control and the mode of employment depends entirely on the intended use. The active compound can be used as such, e. g. in powder form, in the form of gas or mist or as smoke. For most purposes, however, it is more economical to combine it with suitable carriers and distributing agents. A number of such substances suitable for the usual forms of application such as dusting agents, spraying agents (suspensions), solutions, aerosols, emulsions and semi-solid preparations (ointments) are given below.

As solid pulverulent carriers may be used, e. g. calcium carbonate, in the form of whiting or ground limestone, kaolin, bole, bentonite, talcum, powdered magnesia, kieselguhr, boric acid, tricalcium phosphate, and also powdered wood, powdered cork and other materials of a vegetable nature. By the addition of wetting agents and protective colloids the pulverulent preparations can be suspended in water and used as spraying agents. The active substance can be combined with the carrier for example by impregnating the carrier with solutions of the active ingredients, by mixing the molten active ingredients with the carriers, or by milling the components together.

Solutions (for spraying) in high boiling carrier solvents such as kerosene and similar mineral oil fractions, in methyl naphthalenes, xylenes, etc. are best suited for direct spraying of objects. They can also be used for impregnating wood. Solutions in lower boiling solvents such as trichlorethylene, tetrachlorethane, ethylene chloride are most suitable for spreading the active ingredient in the form of a mist. The latter solvents, and also, for example, benzine, xylene and chlorobenzene are also suitable for the impregnation of textiles. The active substance is soluble in water to some extent. Water, therefore, if required with the addition of solvents, also comes into consideration as a carrier-solvent and also water-soluble organic solvents such as alcohol or acetone.

Fluoro-trichloromethane and difluoro-dichloromethane are examples of solvents and propelling agents for aerosols.

As emulsifying agents ahere come into consideration those of a cation-active nature such as quaternary ammonium compounds, anion-active agents such as soap, soft soap, resin soap, aliphatic monoesters of sulphuric acid and aliphatic aromatic sulphonic acids, and also non-ionogenic emulsifying agents such as higher molecular ethylene oxide condensation products. They are mixed to an emulsifiable concentration with the active ingredients with or without the addition of suitable solvents such as e. g. acetone, alcohols, cyclohexanone, benzene, toluene, xylene, tetrahydronaphthalene, alkylated naphthalenes, phthalic acid esters, mineral and vegetable oils, resins, and, if required, water.

Petroleum jelly and other ointment bases in which the active ingredient can be incorporated are examples of semi-solid distributing agents.

The active ingredient can also be used together with attractives or lures to form a bait, such as, e. g. sugar, for example in the form of dusting agents with sugar as the main carrier, or spraying agents or in the form of fly-papers.

The various forms of application can generally be adapted to the intended use by the addition of substances which improve the distribution, the adhesive properties and resistance to rain on the treated surface, such as, e. g. fatty acids, resins, wetting agents, glue, casein or alginates. The biological activity can also be increased by the addition of substances with bactericidal, fungicidal or also insecticidal properties.

As bactericidal substances that can be added come into consideration, e. g. chlorinated phenols and quaternary ammonium compounds, suitable fungicidal compounds include e. g. sulphur in its various forms of application, such as lime-sulphur liquid, copper compounds such as copper oxychloride or Bordeaux liquid and fluorides. As examples of further insecticidal compounds may be named: synthetic products like 1.1-bis-(p-chlorophenyl)-2.2.2-trichlorethane, γ-hexachlorocyclohexane, p-nitrophenyl-di-ethylthiophosphate, tetra-ethyl-pyrophosphate, chlorinated camphene, 1.2.4.5.6.7.8.8-octachloro-4.7-methano-3a.4.7.7a-tetrahydroindane and 5.5-dimethyl-dihydroresorcinol-dimethyl carbamate. Pyrethrin and rotenone are suitable vegetable products.

Example 2.—Dusting agent 1 part of 2,6-dimethyl-pyridyl-(4)-dimethyl carbamate is ground as finely as possible with 99 parts of talc. The adhesive properties of this powder can be increased by the addition of 2 parts of a liquid fatty acid and 1 part of quenched lime. This dusting agent can be used, for example, to combat pests in plant protection and in the household. In this form, the agent can also be used for protection of storerooms, either by dusting or mixing it with the goods themselves.

Example 3.—Spraying agent 25 parts of 2,6-dimethyl-pyridyl-(4)-dimethyl carbamate, 35 parts of kaolin, 30 parts of a porous carrier, e. g. colloidal silicic acid and 10 parts of sulphite waste liquor are pulverised as finely as possible. On stirring with water, a very suitable spraying agent is obtained for combating flies in stalls where animals are kept.

Example 4.—Sprinkling agent (spray)

(a) 2 parts of 2,6-dimethyl-pyridyl-(4)-dimethyl carbamate are dissolved in 10 parts of xylene and 88 parts of kerosene.

(b) 2 parts of 2,6-dimethyl-pyridyl-(4)-dimethyl carbamate and 3 parts of 1.1-bis-(p-chlorophenyl)-2.2.2-trichlorethane are dissolved in 10 parts of xylene or another mutual solvent and 85 parts of kerosene.

Both solutions are excellently suited for combating flies in the household and also in storerooms and slaughter-houses.

Example 5.—Fumigating agent 50 parts of active ingredient, e. g. 2,6-dimethyl-pyridyl-(4)-dimethyl carbamate, 22 parts of sugar, 12 parts of potassium chlorate, 2.4 parts of potassium nitrate and 13.6 parts of sawdust are ground and thoroughly mixed together. The mass is put into boxes and it is set alight by either a wick or a fuse.

The insecticidal smoke formed by burning the tablets or the boxed fumigating mass is specially suitable for combating insects in enclosed spaces.

Example 6.—Emulsion 20 parts of 2,6-dimethyl-pyridyl-(4)-dimethyl carbamate, 25 parts of acetone, 20 parts of xylene and 35 parts of a higher molecular condensation product derived from a fatty alcohol and ethylene oxide are dissolved together.

What we claim is:

1. As a new chemical compound, 2,6-dimethyl-pyridyl-(4)-dimethyl carbamate.

2. A pest combating agent comprising as essential active ingredient 2,6-dimethyl-pyridyl-(4)-dimethyl carbamate in solution in a solvent selected from the group consisting of kerosene, fluoro-trichloromethane and difluoro-dichloromethane.

References Cited in the file of this patent

UNITED STATES PATENTS

| Number | Name | Date |
| --- | --- | --- |
| 2,489,247 | Wuest | Nov. 22, 1949 |

OTHER REFERENCES

Chemical Abstracts, Decennial Index (1937–46), p. 8416.